(12) United States Patent
Song

(10) Patent No.: US 9,793,786 B2
(45) Date of Patent: Oct. 17, 2017

(54) SELF-ADJUSTING TORQUE DEVICE

(71) Applicants:BEIJING BOE OPTOELECTRONICS TECHNOLOGY CO., LTD., Beijing (CN); BOE TECHNOLOGY GROUP CO., LTD., Beijing (CN)

(72) Inventor: Hangbin Song, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 670 days.

(21) Appl. No.: 14/168,130

(22) Filed: Jan. 30, 2014

(65) Prior Publication Data

US 2014/0148256 A1 May 29, 2014

Related U.S. Application Data

(63) Continuation of application No. 12/128,712, filed on May 29, 2008, now abandoned.

(30) Foreign Application Priority Data

Sep. 28, 2007 (CN) .......................... 2007 1 0175309

(51) Int. Cl.
*H02K 49/00* (2006.01)
*B65H 59/04* (2006.01)
*B65H 59/38* (2006.01)

(52) U.S. Cl.
CPC ........... *H02K 49/00* (2013.01); *B65H 59/043* (2013.01); *B65H 59/385* (2013.01); *Y10T 464/30* (2015.01)

(58) Field of Classification Search
CPC .... H02K 49/00; H02K 49/104; H02K 49/108; H02K 49/046; B65H 59/043; B65H 59/385; Y10T 464/30
USPC .......................................................... 464/29
See application file for complete search history.

(56) References Cited

U.S. PATENT DOCUMENTS 3,595,495 A * 7/1971 Cloeren ............. B65H 23/1806
242/413.9

FOREIGN PATENT DOCUMENTS

| JP | 56-108653 A | 8/1981 |
|----|----|----|
| JP | 5-252800 A | 9/1993 |
| JP | 05252800 A * | 9/1993 |

OTHER PUBLICATIONS

Non-English Examination Report dated Sep. 1, 2014 for corresponding Japanese Application No. 2008-141723 and an English-language version thereof.

(Continued)

*Primary Examiner* — Sang Kim
*Assistant Examiner* — Juan Campos, Jr.
(74) *Attorney, Agent, or Firm* — Ladas & Parry LLP

(57) ABSTRACT

There is provided a torque device which includes a driving module, a driven module and an adjusting module. The adjusting module comprises a magnetic torque device, wherein an input end of the magnetic torque device is capable of being driven by the driving module, an output end of the magnetic torque device is capable of driving the driven module, the input end and the output end of the magnetic torque device have a variable distance therebetween, and the input end is capable of driving the output end to transfer a torque in operation.

5 Claims, 3 Drawing Sheets

(56) References Cited

OTHER PUBLICATIONS

Non-English Examination Report dated Apr. 16, 2014 for corresponding Japanese Application No. 2008-141723 and an English-language version thereof.
Espacenet English abstract of JP 56-108653 A.
Espacenet English abstract of JP 5-252800 A.
Non-English Examination Report for corresponding Japanese Application No. 2012091724 and an English-language version thereof.
Non-English Examination Report dated Mar. 9, 2015 for corresponding Japanese Application No. 2012-91724 with English translation.

* cited by examiner

SELF-ADJUSTING TORQUE DEVICE

BACKGROUND OF THE INVENTION

The present invention relates to a self-adjusting torque device.

During production process, some raw/auxiliary materials are fed and recovered in a winding form. In the course of feeding and recovering of a winding material, a torque of a driving motor M (M=R×F) is maintained constant. Since a radius R of the winding material varies with the feeding of the material, a tension F of the material is changed accordingly, which affects the accuracy of the feeding of material.

FIG. 1 is a diagram illustrating a tension variation during the course of feeding and recovering of a winding material in the related art. At an initial stage, the radius R1 of the winding material is the largest, while the tension F1 is the smallest; after an operation of a period of time, the radius R2 of the winding material is decreased, and the tension F2 is increased where the torque M is kept unvaried.

A known approach for solving the above problem is to provide three radius detecting sensors beside the material roll with each sensor corresponding to a respective predetermined radius. For example, a first sensor corresponds to a radius R1, a second sensor corresponds to a radius R2, and a third sensor corresponds to a radius R3. When the three sensors are triggered simultaneously, the motor outputs a torque M1=R1×F; when the second and the third sensors are triggered, the motor outputs a torque M2=R2×F; and when only the third sensor is triggered, the motor outputs a torque M3=R3×F. Thus, following the variation of the radius of the winding material (for example, R1, R2 and R3, respectively), the torque is varied accordingly (for example, M1, M2 and M3, respectively), so as to keep the tension F constant.

In the above approach, the variation of the torque suffers from abrupt changes; that is to say; the differences between the torques M1 and M2 and between M2 and M3 are very great, and thus a smooth and gradual change is not available. In addition, when the radius of the winding material is in a range between R1 and R2 or between R2 and R3, the tension F will continue to vary with the change of the radius and still results in inaccuracy of feeding and recovering of the winding material.

SUMMARY OF THE INVENTION

According to an embodiment of the present invention, a self-adjusting torque device is provided, which includes a driving module connected to a power inputting apparatus and having an acting force which is a first tension generated by the power inputting apparatus; a driven module connected to a winding material and having an acting force which is a second tension applied on the winding material; an adjusting module connected to the driving module and the driven module and adjusting a distance between the driving module and the driven module according to the second tension so as to keep the second tension identical with the first tension.

In the embodiment of the present invention, it is possible to automatically adjust the torque of a winding material feeding or recovering device, keep a tension of the winding material feeding or recovering device constant and thereby guarantee the accuracy of feeding or recovering the material.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

The implementations of the present invention provide a self-adjusting torque device so as to address the problem that the tension is not stable during feeding or recovering of a winding material in the related art, realize automatic adjustment of the torque of a material feeding or recovering device, keep the tension stable and guarantee accuracy of feeding or recovering the material.

Figure 1:
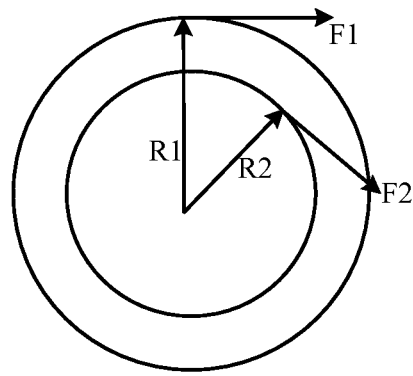
FIG. 1 is a diagram illustrating a tension variation during the course of feeding and recovering winding material in the related art.
Figure 2:
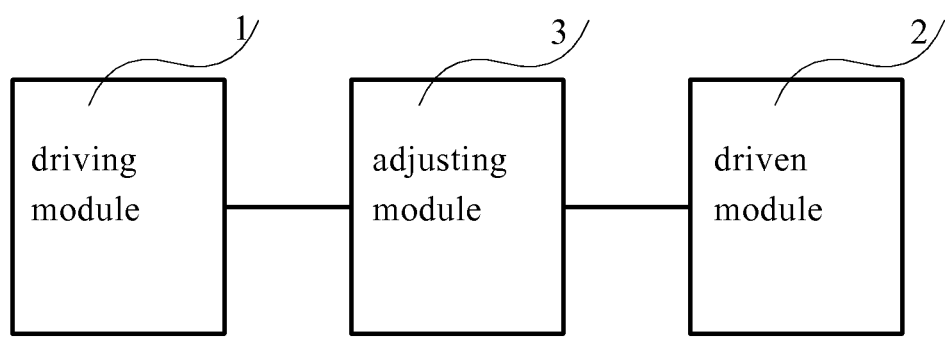
FIG. 2 is a diagram illustrating a configuration of a self-adjusting torque device according an embodiment of the present invention.

FIG. 2 is a diagram illustrating a self-adjusting torque device according to an embodiment of the present invention. As shown in FIG. 2, the self-adjusting torque device includes: an driving module 1 for introducing an external power and having a first tension; a driven module 2 connected to a winding material, reflecting a second tension acting on the winding material; and an adjusting module 3 connected to both of the driving module 1 and the driven module 2, for receiving the first and the second tensions and self-adjusting the second tension to keep it consistent with the first tension.

In the present embodiment, it is possible to self-adjust a torque of a winding material feeding and recovering device, so as to keep a tension on the winding material feeding and recovering device constant, thereby guaranteeing the accuracy of the feeding and recovering of the material.

Figure 3:
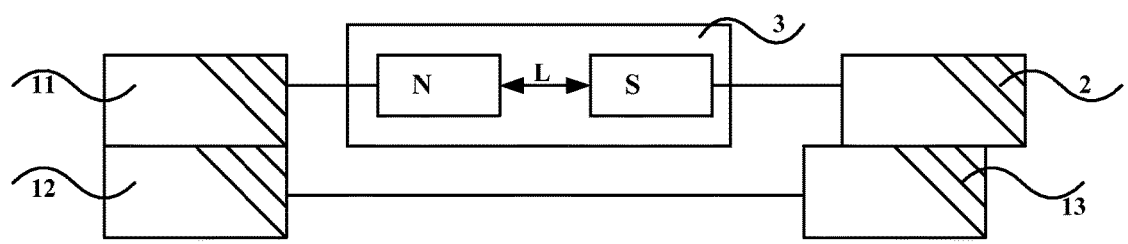
FIG. 3 is a diagram illustrating a configuration of a first example of a self-adjusting torque device according to an embodiment of the present invention.

FIG. 3 is a diagram illustrating a configuration of a first example of a self-adjusting torque device according to the embodiment of the present invention. As shown in FIG. 3, the self-adjusting torque device includes: a driving module comprising a first driving screw 11, second driving screw 12, and a third driving screw 13; a driven screw 2 serving as a driven module; and an electromagnetic torque device 3 serving as an adjusting module. The first driving screw 11, the second driving screw 12, and the third driving screw 13 are mounted on respective axes through bearings, and the driven screw 2 is movable on its axis within a predetermined range.

The left side of the first driving screw 11 is connected to a motor, so as to start the winding material feeding and recovering device. After the device is started, a rotating speed of the first driving screw 11 is set to n1, and the first driving screw 11 drives the second driving screw 12 to rotate through engagement. Since the first driving screw 11 and the second driving screw 12 are both secured with bearings, that is, their positions both are fixed, the second driving screw 12 has a rotating speed that is substantially the same as the rotating speed of the first rotating screw 11, i.e., n1, after the second driving screw 12 is driven to rotate by the first driving screw 11. Since the relative position of the third driving screw 13 with respect to the second driving screw 12 is also fixed (the axes on which the second driving screw 12 and the third driving screw 13 are mounted can be fixed, or the second driving screw 12 and the third driving screw 13 can be provided on the same axis), the third driving screw 13 has a rotating speed that is substantively the same as the rotating speed of the second driving screw 12, i.e., n1. The driven screw 2 engaged with the third driving screw 13 has its right side connected to the winding material, and the driven screw 2 is not securely fixed on an axis but movable forward and backward within a predetermined distance. The rotating speed of the driven screw 2 is set to n2. When the rotating speed n2 of the driven screw 2 is larger than the rotating speed n1 of the third driving screw 13, the driven screw 2 moves towards the right side (a direction towards the winding material), when the rotating speed n2 of the driven screw 2 is less than the rotating speed n1 of the third driving screw 13, the driven screw 2 moves towards the left side (a direction away from the winding material); and when the rotating speed n2 of the driven screw 2 is equal to the rotating speed n1 of the third driving screw 13, a relative position of the third driving screw 13 is fixed. The above conditions can be satisfied by designing pitches and directions of the threads of the third driving screw 13 and the driven screw 2 to make them consistent.

The electromagnetic torque device 3 transfers torques through electromagnetic forces. That is, one end of the electromagnetic torque device is an electromagnetic N pole, the other end is an S pole, and the two ends are facing with each other with a distance L therebetween. On the basis of "attraction for opposite poles" principle, when the N pole rotates, the S pole rotates with it, and a transferring torque M between the N pole and the S pole is inversely proportional to the distance L, so that the larger the distance L is, the smaller the transferred torque M is, and vice versa.

The self-adjusting torque device for winding material is operated as follows.

The left side of the first driving screw 11 is connected to the motor to receive power from the motor so as to starting the device. The motor drives the first driving screw 11 to rotate at a rotating speed n1. Since the second driving screw 12 is engaged with the first driving screw 11, and the first and the second driving screws 11 and 12 are fixed, the first driving screw 11 drives the second driving screw 12 to rotate, and the second driving screw 12 has a rotating speed that is the same as the rotating speed of the first driving screw 11, i.e., n1.

The right side of the first driving screw 11 is connected to the electromagnetic torque device, and the electromagnetic torque device transfers a torque M from its left end connected to the first driving screw 11 to the right end thereof. Suppose that at this time, a distance between the left and the right ends of the electromagnetic torque device is L, the torque received by the right end from the left end of the electromagnetic torque device is M1 (the acting force on the right end is the second tension F1), and the rotating speed of the driven screw 2, which is driven by the torque M1 from the right end to rotate, is n2.

If the rotating speed n2 of the driven screw 2 is less than the rotating speed n1 of the third driving screw 13 (the second tension F1 applied on the driven screw 2 is less than the first tension F applied on the first driving screw 11), the driven screw 2 moves towards the left side, and the distance L of the electromagnetic torque device decreases. Thus, the torque M1 transferred form the left end to the right end becomes larger, and the second tension F1 applied on the driven screw 2 becomes larger, until the rotating speed n2 of the driven screw 2 is equal to the rotating speed n1 of the third driving screw 13, the rotating speeds of the driven screw 2 and the driving screw 13 become identical, and their relative positions are fixed. At this time, the second tension F1 applied on the driven screw 2 is equal to the first tension F applied on the first driving screw 11, and then it is realized to self-adjust the torque M1 and keep the second tension F1 applied on the driven screw 2 constant (F1=F), When the radius of the winding material decreases (changing from R1 to R2), the second tension F1 increases gradually. Since the second tension F1 is also applied on the driven screw 2, the second tension F1 increases, and the rotating speed n2 of the driven screw 2 increases with it. When the rotating speed of the driven screw 2 is larger the rotating speed n1 of the third driving screw 13, the driven screw 2 moves towards the right side, and the distance L between the two ends of the electromagnetic torque device increases. Since the distance L increases, the torque M1 decreases, and thus the second tension F1 applied on the driven screw 2 also decreases gradually, until the second tension F1 is equal to the first tension F.

In the present example, the rotating speeds of the first driving screw 11, the second driving screw 12, and the third driving screw 13 are identical, i.e., n1, which reflects the magnitude of the first tension F. The rotating speed n2 of the driven screw 2 reflects the magnitude of the second tension F1. When the first tension F and the second tension F1 are not identical, the driven screw 2 moves towards left or right, until the rotating speeds of n1 and n2 become identical, so as to automatically adjust the torque applied on the driven screw 2, that is, to automatically adjust the second tension F1 applied on the driven screw 2, so as to keep the second tension F1 identical with the first tension F.

Figure 5:
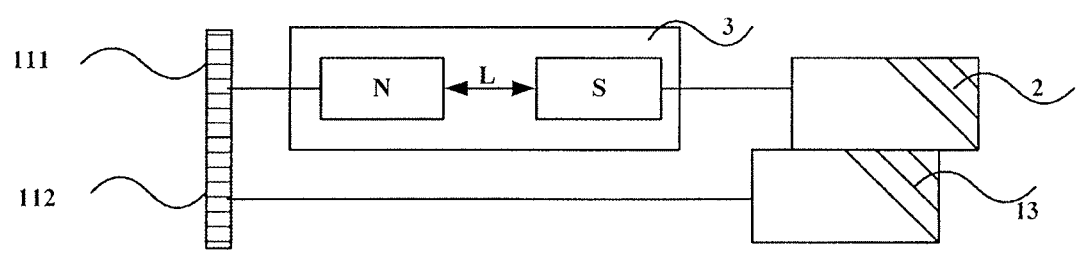
FIG. 5 is a diagram illustrating a configuration of an example of a device according to an embodiment of the present invention.
Figure 6:
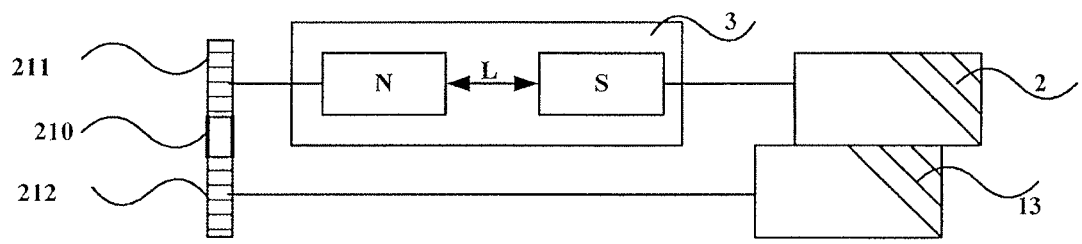
FIG. 6 is a diagram illustrating a configuration of an example of a device according to an embodiment of the present invention.

In the present example, the driving module may comprise a first driven gear, a second driving gear, and a third driving screw. The first driving gear 111 and the second driving gear 112 may mesh with each other as illustrated FIG. 5, or the first driving gear 211 and the second driving gear 212 may be coupled through a chain 210 as illustrated in FIG. 6, so long as the rotating speeds of the first driving gear and the second driving gear can be kept identical. In the present example, the driving module may also comprise a first driving rotary wheel, a second driving rotary wheel, and a third driving screw. The first driving rotary wheel and the second driving rotary wheel are coupled by a belt, so as to keep the rotating speeds of the first and the second driving rotary wheels identical. The operating principle of the mechanism is also as discussed above.

Figure 4:
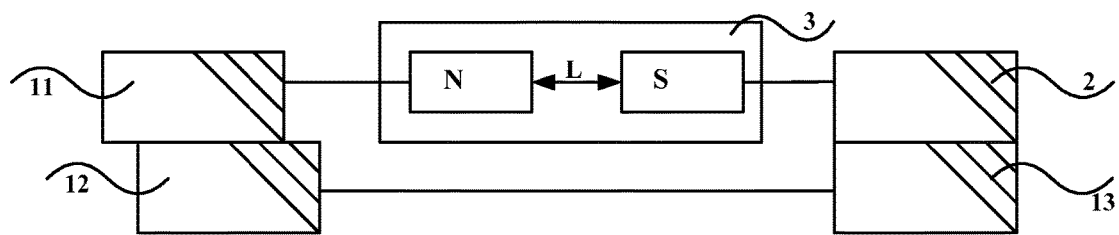
FIG. 4 is a diagram illustrating a configuration of a second example of a self-adjusting torque device according to an embodiment of the present invention.

FIG. 4 is a diagram illustrating a configuration of a second example of a self-adjusting torque device according to the embodiment of the present invention. As shown in FIG. 4, the self-adjusting torque device of the present example differs from that of the first example in that: the first driving screw 11 of the driving module is movable, the position of the driven screw 2 serving as the driven module is fixed, while the positions of the second and the third driving screw 12, 13 of the driving module are kept unchangeable. In this case, the driven screw 2 brings the second and the third driving screws 12, 13 to rotate, that is, the rotating speeds of the second and the third driving screws 12, 13 are identical with that of the driven screw 2. When the rotating speed n2 of the driven screw 2 is larger than the rotating speed n1 of the first driving screw 11 (the second tension F1 is larger than the first tension F), the driving screw 11 moves towards left, and the distance L increases. As a result, the torque transferred by the electromagnetic torque device decreases, that is, M1 decreases, until the second tension F1 is equal to the first tension F. When the rotating speed n2 of the driven screw 2 is less than the rotating speed n1 of the first driving screw 11 (the second tension F1 is less than the first tension F), the driving screw 11 moves towards right, and the distance L between the ends of the electromagnetic torque device decreases. As a result, the torque transferred by the electromagnetic torque device increases, that is, M1 increases, until the second tension F1 is equal to the first tension F.

In the present example, the rotating speeds of the driven screw 2, the second driving screw 12, and the third driving screw 13 are identical, i.e., n2, which reflects the magnitude of the second tension F1. The rotating speed n1 of the first driving screw 11 reflects the magnitude of the first tension F. When the first tension F and the second tension F1 are not identical, the first driving screw 11 moves toward left or right, until the rotating speeds n1, n2 become identical, so as to automatically adjust the torque applied on the driven screw 2, that is, to automatically adjust the second tension F1 applied on the driven screw 2, so as to keep the second tension F1 identical with the first tension F.

In the present example, the driving module may also comprise a first driving screw, a second driving screw, and a third driving gear, and a driven gear may be used as the driven module. The third driving gear and the driven gear can mesh with each other, or be coupled through a chain, so long as the rotating speeds of the third driving gear and the driven gear can be kept identical. In the present example, the driving module may also comprise a first driving screw, a second driving screw, and a third driving rotary wheel, and a driven rotary wheel can be used as the driven module. The third driving rotary wheel and the driven rotary wheel are coupled by a belt, so as to keep the rotating speeds of the third driving rotary wheel and the driven rotary wheel identical. The operating principle of the mechanism is also as discussed above.

The first and the second examples of the self-adjusting torque device according to the embodiment of the present invention automatically adjust the torque applied on the winding material by coupling the two ends of the electromagnetic torque device to a fixed screw and a movable screw, respectively. Based on the principle that the magnitude of the force applied on the material is in direct proportion to the rotating speed of the screw connected to the material, while the torque transferred by the electromagnetic torque device is in reverse proportion to the distance between the two ends of the electromagnetic torque device, the torque applied on the winding material can be adjusted automatically, the force applied on the material can be kept constant, and the accuracy of feeding or recovering material can be guaranteed.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A torque device, including:
   a driving module;
   a driven module capable of driving a winding material; and
   an adjusting module comprising a magnetic torque device, wherein an input end of the magnetic torque device is capable of being driven by the driving module, an output end of the magnetic torque device is capable of driving the driven module, the input end and the output end of the magnetic torque device have a variable straight line distance between the input end and the output end in a direction from the input end to the output end, and the input end is capable of driving the output end to transfer a torque in operation; and
   wherein the driven module comprises a movable screw that is movable along an axis direction, and the driving module comprises a fixed screw that is fixed along the axis direction, and the movable screw that is movable along the axis direction is configured to be movable to change the variable straight line distance between the input end and the output end of the magnetic torque device.

2. The self-adjusting torque device of claim 1, wherein the driving module includes a first driving screw, a second driving screw, and a third driving screw that have fixed positions, the first driving screw and the second driving screw mesh with each other, the second driving screw and the third driving screw are connected with each other, the third driving screw is the fixed screw, and a front end of the first driving screw is configured for connection with a power inputting apparatus;
   the movable screw that is movable along the axis direction meshes with the third driving screw and is configured for connection with the winding material at a rear end of the driven screw; and
   the input end of the magnetic torque device is connected to a rear end of the first driving screw, and the output end is connected to a front end of the movable screw.

3. The torque device of claim 1, wherein the driving module includes a first driving gear, a second driving gear, and a third driving screw that have fixed positions, the first driving gear and the second driving gear mesh with each other, the second driving gear and the third driving screw are connected with each other, the third driving screw is the fixed screw, and a front end of the first driving gear is configured for connection with a power inputting apparatus;
   the movable screw that is movable along the axis direction meshes with the third driving screw and is configured for connection with the winding material at a rear end of the driven screw; and
   the input end of the magnetic torque device is connected to a rear end of the first driving gear, and the output end is connected to a front end of the movable screw.

4. The self-adjusting torque device of claim 1, wherein the driving module includes a first driving rotary wheel, a second driving rotary wheel, and a third driving screw that have fixed positions, the first driving rotary wheel and the second driving rotary wheel are coupled by a belt, the second driving rotary wheel and the third driving screw are connected with each other, the third driving screw is the fixed screw, and a front end of the first driving rotary wheel is configured for connection with a power inputting apparatus;

the movable screw that is movable along the axis direction meshes with the third driving screw and is configured for connection with the winding material at a rear end of the driven screw; and the input end of the magnetic torque device is connected to a rear end of the first driving rotary wheel, and the output end is connected to a front end of the movable screw.

5. The torque device of claim 1, wherein the driving module includes a first driving gear, a second driving gear, and a third driving screw that have fixed positions, the first driving gear and the second driving gear are coupled by a chain, the second driving gear and the third driving screw are connected with each other, the third driving screw is the fixed screw, and a front end of the first driving gear is configured for connection with a power inputting apparatus;

the movable screw that is movable along the axis direction meshes with the third driving screw and is configured for connection with the winding material at a rear end of the driven screw; and the input end of the magnetic torque device is connected to a rear end of the first driving gear, and the output end is connected to a front end of the movable screw.

\* \* \* \* \*